US012441974B2

(12) United States Patent
Tedeschi et al.

(10) Patent No.: US 12,441,974 B2
(45) Date of Patent: Oct. 14, 2025

(54) BIOREACTOR DESIGN AND METHODS OF MANUFACTURE THEREOF

(71) Applicant: Mott Corporation, Farmington, CT (US)

(72) Inventors: Gregory Tedeschi, Cromwell, CT (US); Patrick Stephen Hill, Vernon, CT (US)

(73) Assignee: MOTT CORPORATION, Farmington, CT (US)

( * ) Notice: Subject to any disclaimer, the term of this patent is extended or adjusted under 35 U.S.C. 154(b) by 787 days.

(21) Appl. No.: 17/168,893

(22) Filed: Feb. 5, 2021

(65) Prior Publication Data

US 2021/0238530 A1    Aug. 5, 2021

Related U.S. Application Data

(60) Provisional application No. 62/970,614, filed on Feb. 5, 2020.

(51) Int. Cl.
    *C12M 1/00*    (2006.01)
(52) U.S. Cl.
    CPC ............ *C12M 29/14* (2013.01); *C12M 27/20* (2013.01); *C12M 29/06* (2013.01)
(58) Field of Classification Search
    CPC ....... C12M 1/126; C12M 25/10; C12M 25/12
    See application file for complete search history.

(56) References Cited

U.S. PATENT DOCUMENTS

| 4,683,062 A | 7/1987 | Krovak et al. |
| 4,728,082 A | 3/1988 | Emmett, Jr. et al. |
| 4,833,083 A | 5/1989 | Saxena |
| 5,187,095 A | 2/1993 | Bliem et al. |
| 5,260,211 A | 11/1993 | Matsuda et al. |
| 5,407,647 A | 4/1995 | Tarancon |
| 5,500,130 A | 3/1996 | Smith et al. |
| 5,705,390 A | 1/1998 | Kadouri et al. |
| 5,744,105 A | 4/1998 | Stormo |
| 10,392,593 B2 | 8/2019 | Kasuto et al. |

(Continued)

FOREIGN PATENT DOCUMENTS

| CN | 105820952 | * | 8/2016 |
| CN | 108004123 A | | 5/2018 |

(Continued)

OTHER PUBLICATIONS

ChemnetBase ("Polypropylene") Accessed: Aug. 5, 2023. (Year: 2023).*

*Primary Examiner* — Michael A Marcheschi
*Assistant Examiner* — Nathan G Esperon
(74) *Attorney, Agent, or Firm* — CANTOR COLBURN LLP

(57) ABSTRACT

Disclosed herein is a bioreactor comprising a vessel comprising; a first tube for transporting retentate to a retentate receiving tank; a second tube that surrounds the first tube for transporting a permeate to a permeate receiving tank; and a third tube that surrounds the second tube; wherein the third tube is in fluid communication with a sparger; and wherein the third tube transports a fluid that sparges a biological broth disposed in the vessel and wherein a membrane that separates the first tube from the second tube separates the biological broth into the permeate and the retentate.

10 Claims, 2 Drawing Sheets

(56) References Cited

U.S. PATENT DOCUMENTS

| | | | |
|---|---|---|---|
| 11,136,542 B2 | 10/2021 | De et al. | |
| 2003/0168403 A1* | 9/2003 | Corcho-Sanchez | C12M 29/04 |
| | | | 210/631 |
| 2010/0034050 A1 | 2/2010 | Erb et al. | |
| 2011/0287404 A1* | 11/2011 | Niazi | C12N 5/04 |
| | | | 435/284.1 |
| 2012/0295332 A1 | 11/2012 | Cheng | |
| 2016/0237394 A1* | 8/2016 | Lipkens | B06B 1/0644 |
| 2016/0289621 A1* | 10/2016 | Oelschlager | C12M 37/00 |
| 2018/0320124 A1* | 11/2018 | Müller-Auffermann | |
| | | | B01F 25/50 |
| 2019/0048305 A1* | 2/2019 | De | C12M 29/10 |

FOREIGN PATENT DOCUMENTS

| | | | | |
|---|---|---|---|---|
| DE | 2017351 A1 | | 11/1971 | |
| JP | H0595778 A | | 4/1993 | |
| KR | 860000697 B1 | | 6/1986 | |
| KR | 101755545 | * | 7/2017 | |
| WO | WO-2006005305 A2 | * | 1/2006 | C12M 47/10 |
| WO | 2022012843 A1 | | 1/2022 | |

\* cited by examiner

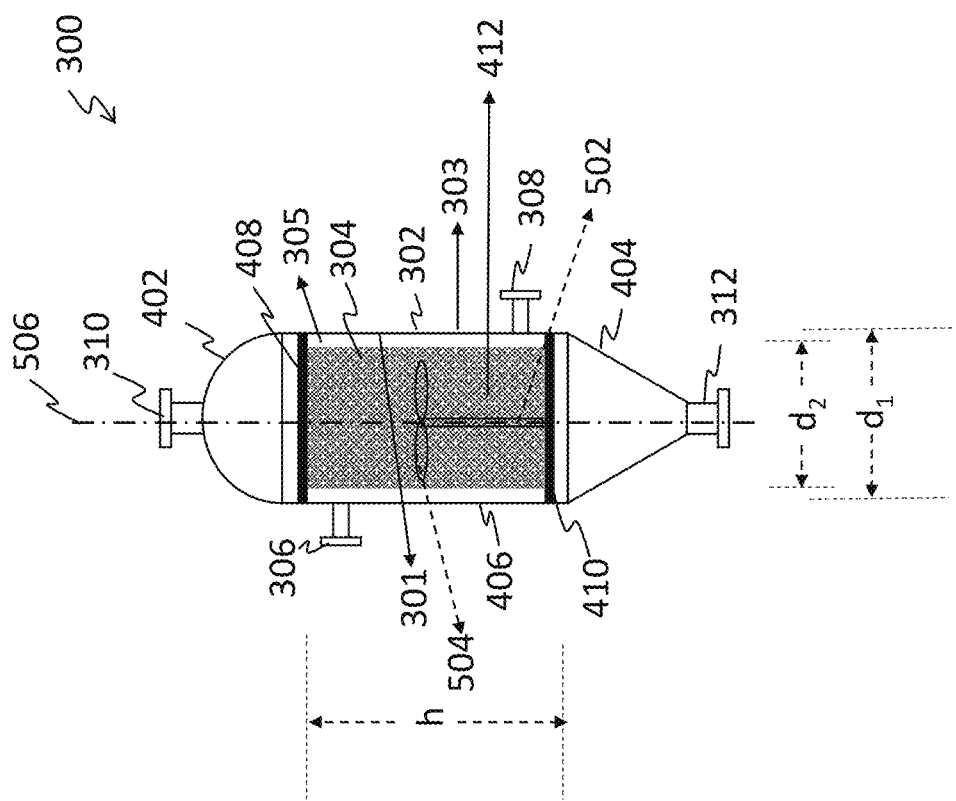

BIOREACTOR DESIGN AND METHODS OF MANUFACTURE THEREOF

CROSS-REFERENCE TO RELATED APPLICATION

This application claims the benefit of U.S. Provisional Application Ser. No. 62/970,614, which was filed on Feb. 5, 2020. The entire content of the foregoing provisional application is incorporated herein by reference.

BACKGROUND

This disclosure is directed to a bioreactor design and to methods of manufacture thereof. More specifically, this disclosure is directed to a bioreactor design that includes a sparger-mixer-filter assembly for cell cultivation.

Cell culturing processes for the production of biological substances range in complexity from simple manually operated batch processes to complex computer controlled continuous cultivation bioreactors; for instance, from simple 50 milliliter (mL) spinner flasks to complex stirred-tank bioreactors of 500 liters or more with automatically operated multiple measurement devices and feedback controls. The basic principle behind each process is to utilize cells as catalytic engines to produce useful biological substances such as viruses or proteins using medium in which the cells are bathed to provide both a source of desired nutrients and a means of removing inhibitory waste material.

As the production of biological substances moves from the research laboratory to commercial production, competitive markets demand productivity improvements. The yield of product from each commercial bioreactor becomes critical. So to with quality, the market demands reliability and consistency of output. Current cell culturing processes readily reach their limiting conditions for production of biological substances. These limitations are imposed by the nutrient and oxygen requirements of the cells and by accumulation of inhibitory waste metabolites; and are reached well before the theoretical limits of cell growth or protein production are reached.

Not all cell types are capable of producing all biological substances. Many biological substances found in certain cells are incompatible with or even toxic to other cell types. The choice of cell types in many situations depends on the structural complexity of the end protein being produced. While protein production levels are high in prokaryotic organisms given their rapid growth and concomitant high levels of protein expression, they are not always capable of producing functional proteins as they perform no or incomplete or different post-translational and/or co-translational modifications such as glycosylation, phosphorylation and complex multi-unit macro-assembly.

Animal cells do perform the necessary complex post-translational modifications including glycosylation, phosphorylation and macro-assembly. However, some animal cells, especially mammalian cells, are difficult to grow and maintain and do not readily lend themselves to high yield production of biological substances under industrial conditions. As a subset of animal cells, insect cells are capable of glycosylation, phosphorylation and macromolecular assembly. For the production of many recombinant proteins, insect cells are an excellent choice because these cells have simple growth requirements, are highly susceptible to infection by recombinant baculoviruses engineered to produce biological substances in insect cells, and have a good safety profile.

Cell types and desired growth dynamics dictate the selection of a bioreactor type. Basic bioreactor devices include culture flasks, roller bottles, shaker flasks, stirred-tank reactors, air-lift reactors and more recently, hollow fiber reactor devices. There are advantages and disadvantages to each type of bioreactor and these advantages and disadvantages vary according to the type of cell cultured in the system and the specific properties of those cells. What works well with attached cells may not with suspended cells. Therefore, improved bioreactors need to be flexible. They should support various cell types, operate for short or long duration cultivation periods and should operate at scales ranging up to 10,000 liters.

It is important in cell culture processes to maintain the physicochemical environment in view of dissolved oxygen, culture pH, temperature and shear sensitivity. In addition, it is desirable to maintain the nutritional environment. The maintenance of the cultivation conditions limits the possibility of performing large scale cell cultivation. Undesirable concentration gradients can often develop in reactors and this inhibits cell growth in large-scale bioreactors.

It is therefore desirable to have a bioreactor design where a variety of different processes can be conducted simultaneously so that large scale cell growth can occur without developing conditions that inhibit growth.

SUMMARY

Disclosed herein is a bioreactor comprising a vessel comprising; a first tube for transporting retentate to a retentate receiving tank; a second tube that surrounds the first tube for transporting a permeate to a permeate receiving tank; and a third tube that surrounds the second tube; wherein the third tube is in fluid communication with a sparger; and wherein the third tube transports a fluid that sparges a biological broth disposed in the vessel and wherein a membrane that separates the first tube from the second tube separates the biological broth into the permeate and the retentate.

Disclosed herein too is a method comprising charging a biological broth to a vessel to a height greater than a height of a sparger contained in the vessel; where the vessel comprises a first tube for transporting retentate to a retentate receiving tank; a second tube that surrounds the first tube for transporting a permeate to a permeate receiving tank; and a third tube that surrounds the second tube; wherein the third tube is in fluid communication with a sparger; and wherein the third tube transports a fluid that sparges the biological broth disposed in the vessel; sparging the biological broth; increasing a pressure in the vessel; filtering the biological broth at a boundary of the first tube and the second tube to create a retentate and a permeate; transporting the permeate to a permeate receiving tank; and transporting the retentate to a retentate receiving tank.

Disclosed herein too is a bioreactor that comprises an outer shell; the outer shell comprising a first inlet port that is operative to charge a material to be sparged into a central region of the bioreactor; a sparging inlet port that is operative to allow a sparging gas to enter the outer shell and a filtrate outlet port that is operative to remove the filtrate from the bioreactor; a porous barrier disposed within the outer shell; the porous barrier encompassing the central region; and a space encompassed between the outer shell and the porous barrier for collecting a filtrate from the material to be sparged; where there is fluid communication between the central region and the space.

Disclosed herein too is a method comprising charging a material to be filtered and/or sparged to a central region of a bioreactor; where the bioreactor comprises an outer shell; the outer shell comprising a first inlet port that is operative to charge a material to be sparged into a central region of the bioreactor; a sparging inlet port that is operative to allow a sparging gas to enter the outer shell and a filtrate outlet port that is operative to remove the filtrate from the bioreactor; a porous barrier disposed within the outer shell; the porous barrier encompassing the central region; and a space encompassed between the outer shell and the porous barrier for collecting a filtrate from the material to be sparged; where there is fluid communication between the central region and the space; separating the filtrate from the material to be filtered and/or sparged; where the filtrate is collected in the space; and discharging the filtrate from the bioreactor.

BRIEF DESCRIPTION OF THE FIGURES

FIG. 2 is another exemplary depiction of another embodiment of the bioreactor.

DETAILED DESCRIPTION

Figure 1:
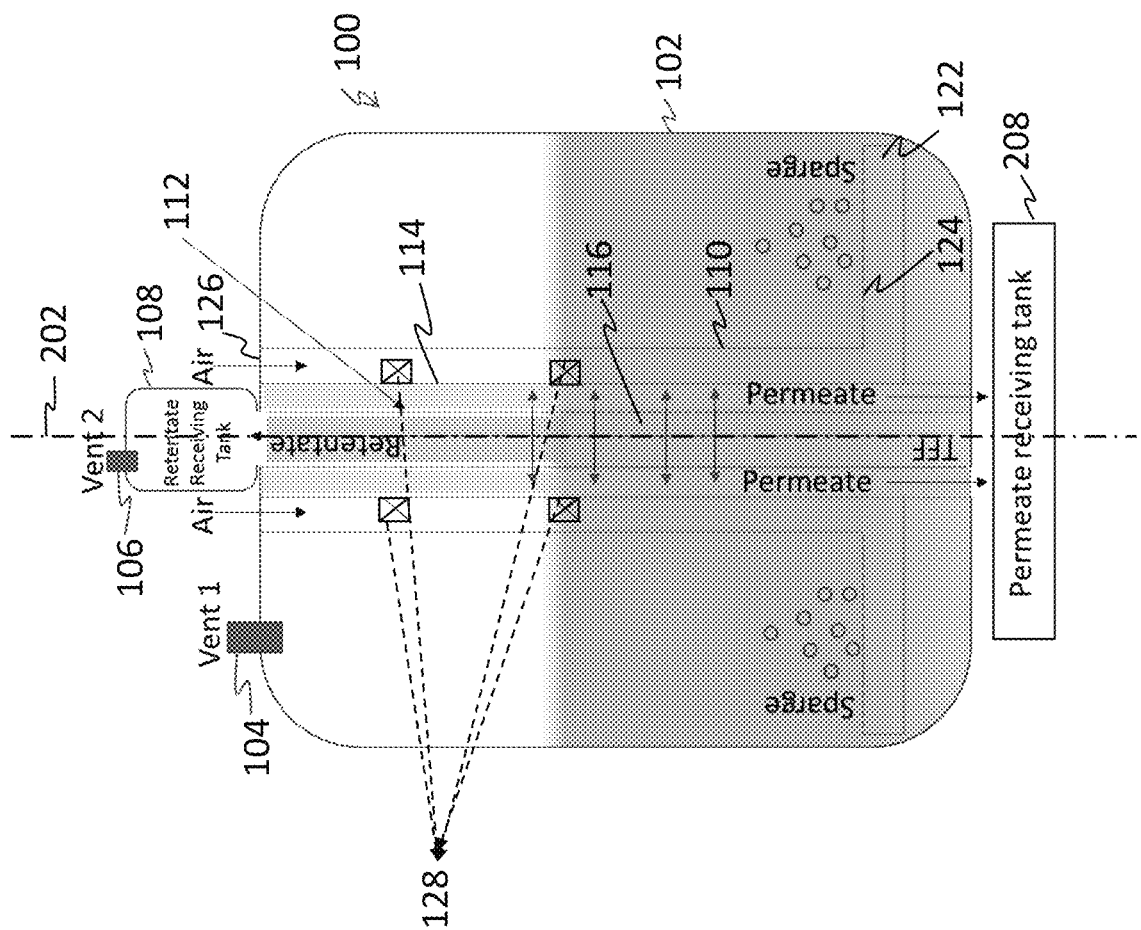
FIG. 1 is an exemplary depiction of one embodiment of the bioreactor.

Disclosed herein is a bioreactor that includes a sparger-mixer-filter assembly that can be continuously used for large scale cell growth. Described herein is an integrated sparger and tangential flow filter assembly for upstream bioprocess aeration and agitation and downstream tangential flow filtration for diafiltration and ultrafiltration. In one embodiment, the bioreactor combines upstream and downstream processes in a single assembly for continuous processing and eliminates the need for impellers (or other moving parts) for mixing and pumps for fluid transfer. In another embodiment, the sparger may be a mobile sparger that can rotate and/or undergo reciprocatory motion along a longitudinal axis. In a preferred embodiment, the bioreactor does not contain any moving parts (or devices) for mixing or for fluid transfer.

The bioreactor may be sized from a small laboratory sized reactor (i.e., 5 liters or less) to a large scale production facility having a capacity of 5000 liters or more, preferably 10,000 liters or more. The bioreactor can advantageously perform sparging, mixing and filtration operations simultaneously.

FIG. 1 is a schematic description of the bioreactor 100 that comprises a vessel 102 (also referred to as a receiving reactor) in which are disposed a sparger 122, a first tube 116 and a second tube 114 that are concentrically mounted. The sparger 122, the first tube 116 and the second tube 114 all share a common longitudinal axis 202. The sparger 122 contains a tubular section 110 (also referred to herein as the third tube 110) that surrounds the second tube 114, which in turns surrounds the first tube 116. The first tube 116 and the second tube 114 are separated by a permeable membrane 112 which separates a biological broth (that is disposed in the vessel) into a permeate and a retentate. In other words the permeable membrane 112 forms the outer circumferential boundary of the first tube 116 and the inner circumferential boundary of the second tube 114. The permeable membrane 112 may be supported on an optional porous reinforcing support (for purposes of strength) if desired.

The first tube 116 is surrounded by the second tube 114, which is in turn surrounded by the third tube 110. In an exemplary embodiment, all three tubes are concentric, i.e., they share the same longitudinal axis. In one embodiment, the first tube contains the retentate after the filtration takes place, while the second tube contains the permeate after the filtration takes place. In another embodiment, the second tube contains the retentate after the filtration takes place, while the first tube contains the permeate after the filtration takes place. In other words, the filtration occurs radially through the membrane that separates the first tube from the second tube and the diffusion of the permeate from the retentate can occur radially outwards or radially inwards (as viewed from the central axis 202 of the tubes).

The sparger 122 comprises the third tube 110 and a porous cylindrical section 124 (hereinafter porous section 124) through which air or any other fluid of choice can escape in order to sparge a biological broth that is contained in the vessel. The porous cylindrical portion lies at the bottom of the third tube 110 and extends radially outwards towards the inner wall of the vessel 102.

The sparger 122 comprises a tubular section 110 that transports air or any other desirable fluid from a pump (not shown) to a porous section 124 that is immersed in the broth. The porous section 124 is preferably horizontal and has an outer diameter almost similar to the inner diameter of the vessel 102. In an embodiment, the sparger 122 is fixed and does not rotate. In another embodiment, the sparger 122 may rotate about the axis 202. One or more bearings 128 disposed between the third tube 110 and the second tube 114 permit rotary or reciprocatory motion of the sparger. Rotary and reciprocatory motion for the sparger may be derived from a motor (not shown). Reciprocatory motion occurs along the central axis 202 of the tubes. The motor may be a stepper motor, a brushless DC motor, a hysteresis motor, a reluctance motor, a universal motor, an induction motor, a synchronous motor, a series motor, a DC shunt motor, a series motor, and so on. In a preferred embodiment, the sparger 122 is fixed and does not rotate.

The vessel 102 contains a first vent 104. The first vent 104 may be fitted with a pressure regulator (not shown) that regulates the pressure in the vessel from ambient conditions to pressures greater than 500 kg/cm$^2$. The vent 104 may also be fitted with a pump (not shown) to draw down pressures to below atmospheric (i.e., draw a vacuum on the vessel 102). In an exemplary embodiment, the vent 104 is opened to permit air used in a sparging process to exit the vessel without any pressure increase. In an embodiment, it is desirable to retain the vessel under ambient conditions during sparging. The sparging process along with the mixing process and the filtration process is detailed later in this document.

The vessel 102 contains a retentate receiving tank 108 at the top of the vessel and a permeate receiving tank at the opposite end of the tank (i.e., at the bottom of the tank). These positions can be reversed, with the permeate receiving tank 208 located at the top of the vessel and the retentate receiving tank located at the bottom of the vessel. In other words, in an embodiment, the retentate and the permeate flow in opposite directions to their respective receiving tanks. In an embodiment, both the retentate and the permeate receiving tanks can be located at one end of the vessel (either the bottom or the top) and both the retentate and the permeate can flow in a single direction (either to the top or to the bottom of the vessel).

Both the permeate receiving tank and the retentate receiving tank may be fitted with vents for permitting air or other undesirable (but environmentally friendly) volatiles to escape from either the permeate or the retentate. In an embodiment, the retentate receiving tank 108 contains a vent 106 (referred to herein as the second vent 106) that permits air contained in the first tube 116 to escape so that all of the retentate can be collected in the retentate receiving tank. The vent 106 is opened during the sparging process to permit the broth to enter the first tube 116 (by virtue of pressure generated in the vessel by the presence of the sparging gas). This pressure also causes the retentate to be displaced to be displaced upwards into the receiving tank 108. The opening of the second vent 106 makes the displacement of air by the retentate possible and this results in the displacement of the retentate into the retentate receiving tank 108 from the first tube 116.

The materials used in the construction of the bioreactor 100 will now be described. The outer wall of the vessel 102 can be manufactured from a suitable metal, a ceramic or a polymer. Suitable metals are stainless steel, titanium, or titanium-steel alloys. Suitable ceramics are glass or quartz. Some of the polymers listed below may be used in the walls of the vessel. The walls of the second tube and the third tube may be manufactured from metals such as steel or from glass. A permeable membrane separates the first tube 116 from the second tube 114.

The permeable membrane 112 may preferably be manufactured from an organic polymer. The permeable membrane is not soluble in the permeate. Suitable organic polymers include thermoplastic polymers, blend of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination thereof. The organic polymers have number average molecular weights greater than 10,000 grams per mole, preferably greater than 20,000 g/mole and more preferably greater than 50,000 g/mole.

Exemplary organic polymers include Examples of thermoplastic polymers that can be used in the polymeric material include polyacetals, polyacrylics, polycarbonates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyguinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination thereof.

Examples of thermosetting polymers suitable for use as hosts in emissive layer include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination thereof.

The operation of the bioreactor 100 will now be described in detail. A broth that contains biological matter and/or chemical matter is introduced into the vessel 102 through an inlet port (not shown). The vessel is filled to a level that is higher than the height of the porous section 124 of the sparger 122.

The tubular section 110 of the sparger 122 has an open portion 124 (the porous section 124) located at the top of the tubular section through which air or another desirable fluid may be introduced. The air travels through the tube and is discharged through the porous section 124 into the broth. The sparger 122 thus facilitates aeration of the broth while at the same time facilitating the preparation of a homogeneous mixture of the broth.

In an embodiment, the fluid introduced through the sparger 122 may be a reactive gas that reacts with the broth to change the chemical composition or physical properties of the permeate or the retentate.

During the sparging, the first vent 104 is closed. This causes a buildup of pressure in the vessel 102. The increasing pressure in the vessel brought on by the sparging facilitates a transportation of the broth into bottom of the first tube 116 where it undergoes filtration through the permeable membrane 112. The filtration process in the first tube 116 leaves behind a retentate which is transported upwards to the retentate receiving tank 108, where it is collected. During this process the second vent 106 may be opened thus permitting the retentate to displace air upwards in the first tube 116. A permeate left behind after the filtration process is transported through the second tube 114 to the permeate receiving tank 208 at the bottom of the reactor 100.

While the FIG. 1 shows that the retentate travels upwards towards the retentate receiving tank and the permeate travels downwards towards the permeate receiving tank, the bioreactor can be designed such that the retentate travels downwards towards the permeate receiving tank and the permeate travels upwards towards the permeate receiving tank.

This system is advantageous in that sparging, mixing and filtration operations can be conducted simultaneously in a device without any moving parts.

The FIG. 2 depicts another embodiment of a bioreactor 300 that has no moving parts and that can be used for filtration. The bioreactor 300 comprises an outer shell in which is disposed a porous barrier 304, which serves as the filter medium. The outer shell comprises an inner surface 303 and an outer surface 301. The inner surface of the outer shell has a diameter $d_1$. At least one surface of the porous barrier 304 is parallel to the inner surface 303 of the outer shell 302. The porous barrier 304 has an inner diameter $d_2$. A space 305 lies between the porous barrier and the inner surface 303. The ratio of $d_2:d_1$ ranges from 0.90 to 0.97, preferably 0.92 to 0.95. The space 305 may be filled with a filtrate during a filtration process.

The outer shell 302 comprises a first inlet port 310 for receiving the material to be filtered. The material may be in the form of a fluid (a liquid, a gas, or a combination thereof)

and may contain entrained solids, liquids or gases (the filtrate) that are to be removed. The outer shell also comprises a first outlet port 312 for removing the material (the residue) after the filtrate has been removed. The material now devoid of the filtrate may be sent to a storage facility (not shown) or subjected to additional processing. The first inlet port 310 and the first outlet port are located 312 are opposedly located on the outer shell 302 and the flow of material (from the first inlet port 310 to the first outlet port 312) is generally facilitated by gravity. In an embodiment, the flow of material from inlet port to outlet port may be assisted by the use of a pump if desired.

The upper portion 402 of the outer shell 302 is preferably hemispherical while the lower portion 404 is preferably funnel shaped. The funnel shaped lower portion 404 terminates at the first outlet port 312. The upper portion 402 is connected to the funnel shaped lower portion 404 by a cylindrical portion 406. The cylindrical portion 406 hosts the porous barrier 304.

The outer shell 302 can be manufactured from a suitable metal, a ceramic or a polymer. Suitable metals are stainless steel, titanium, titanium-steel alloys, nickel, aluminum, nickel based alloys, or a combination thereof. Suitable ceramics are glass, oxides (quartz, alumina, titania, zirconia, or the like), carbides (silicon carbide, titanium carbide, or the like), nitrides (silicon nitride, titanium nitride, or the like), or the like. Some of the polymers listed above may be used in the outer shell 302.

The outer shell 302 also comprises a sparging inlet port 306 for fluids that facilitate sparging and a filtrate outlet port 308 for collecting filtrate that is separated from the material that is to be filtered. The sparging fluid is preferably air or an inert gas such as nitrogen, carbon dioxide, argon, and the like. The inlet port 306 is located on the cylindrical portion 406 of the outer shell. The cylindrical portion 406 feeds the sparging fluid into the bioreactor either radially (directly from the outer circumference towards the central axis 202 of the bioreactor), or alternatively, feeds it tangentially (along the outer circumference) of the cylindrical portion 406.

This porous barrier 304 will be sized and located such that there a large enough gap (the space 305) between the porous barrier and the inner surface 301 of the outer shell 302 to allow for even flow distribution around the porous barrier 304. In one embodiment, the top and bottom edges of the porous barrier 304 are fixedly attached to the outer shell 302 in order to isolate the space 305 from the main internal chamber. This fixed attachment may be by welding, gasket, clamping, or the like. The porous barrier may utilize additional support to maintain structural integrity and to ensure gap uniformity. The porous barrier 304 may be manufactured from a metal, a ceramic, a polymer, or a combination thereof.

Suitable metals for use in the porous barrier 304 are stainless steel, titanium, titanium-steel alloys, nickel, aluminum, nickel based alloys, or a combination thereof. Suitable ceramics for use in the porous barrier 304 are glass, oxides (quartz, alumina, titania, zirconia, or the like), carbides (silicon carbide, titanium carbide, or the like), nitrides (silicon nitride, titanium nitride, or the like), or the like. Some of the polymers listed above may be used in the porous barrier 304. The average pore size in the porous barrier 304 is 0.1 to 100 micrometers, preferably 2 to 80 micrometers, and preferably 4 to 50 micrometers.

In another embodiment, with reference to the FIG. 2, the porous barrier 304 is fixedly attached to an upper rim 408 and a lower rim 410. Both rims 408 and 410 are in fixed communication with the outer shell 302. The height of the porous barrier 304 is denoted by h. The ratio of h to $d_2$ (the inner diameter of the porous barrier) is from 1.7 to 2.2, preferably 1.8 to 2.1. The outer shell 302 and the porous barrier 304 are preferably concentrically arranged. The space 305 between the rims 408, 410, the porous barrier 304 and the outer shell 302 is used to collect the filtrate during the filtration process. The filtrate is then discharged from the bioreactor via filtrate outlet port 308.

The porous barrier 304 encloses a central region 412 for receiving the material to be filtered or sparged. In either filtration or sparging applications, the material to be filtered or sparged is charged into the central region 412 from the inlet port 310. The space 305 and the central region 412 are in fluid communication with one another.

The sparging fluid enters the bioreactor through the sparging inlet port 306 and circulates in the space 305. This sparging fluid may be used for reverse flow cleaning of the porous barrier 304. The sparging fluid facilitates a separation of the filtrate from the material to be filtered. The filtrate (which may be a solid, a liquid or a gas) is then discharged from the bioreactor via filtrate outlet port 308. When the filtrate is a solid, mechanical means may be employed to facilitate filtrate removal from the bioreactor 300.

In yet another embodiment the bioreactor 300 depicted in the FIG. 2 may be optionally fitted with an impeller 504 that is mounted on a central shaft 502. The central shaft 502 is in rotary communication with a motor (not shown). The impeller 504 imparts rotary motion to the material to be sparged and/or filtered. The impeller rotates at a speed of 2 to 300 rpm, preferably 20 to 200 rpm, and more preferably 30 to 150 rpm. The centrifugal forces drive the filtrate from the material to the space 305, where it is contacted by the sparging fluid. The sparging fluid improves the separation of the filtrate from the material to be filtered and/or sparged.

In yet another embodiment, the porous boundary 304 may be also undergo rotary motion to impart centrifugal forces to the material to be sparged and/or filtered. In this embodiment, the rims 408 and 410 are not fixedly attached to the outer shell 302 but are instead fitted with roller bearings (not shown) that contact the outer shell. The circumferential outer surface of the rims 408 and 410 are fitted with roller bearings that rotate along the inner surface of the outer shell 302. Since the rims are fixedly attached to the porous boundary 304, rotary motion of the rims causes the porous boundary to rotate as well thus causing the material to be sparged and/or filtered to also undergo rotary motion. The porous boundary 304 rotates about a central longitudinal axis 506. The rotary motion of the fluid imparts centrifugal forces to the filtrate which diffuses to the space 305 through the porous boundary 304. During travel through the porous boundary 304, the filtrate is separated from the material to be filtered. The centrifugal forces drive the filtrate from the material to the space 305, where it is contacted by the sparging fluid. The sparging fluid improves the separation of the filtrate from the material to be filtered and/or sparged.

The bioreactor 300 detailed herein improves process throughput by leveraging sparging aeration, reduced shear stress, and incorporates tangential flow filtration principles in a continuous model in a single assembly/vessel as opposed to discrete upstream and downstream equipment. It reduces connections, leak points and hardware such as impellers and pumps.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A bioreactor comprising:
a vessel that is cylindrically shaped, extends axially between top and bottom ends, and has a radial outer surface, wherein the vessel is configured to contain a biological broth,
the vessel comprising:
a retentate receiving tank located at one of the top and bottom ends of the vessel;
a permeate receiving tank located at one of the top and bottom ends of the vessel;
a first tube, at a radial center of the vessel, wherein the first tube extends between the top and bottom ends of the vessel, for transporting a retentate to the retentate receiving tank;
a second tube, at the radial center of the vessel, wherein the second tube extends between the top and bottom ends of the vessel and radially surrounds the first tube for transporting a permeate to the permeate receiving tank;
a permeable membrane separates the first tube from the second tube; and
a third tube, at the radial center of the vessel, wherein the third tube has an axial portion and a radial portion, wherein:
the axial portion of the third tube extends from the top end of the vessel toward the bottom end of the vessel and terminates within the vessel, near the bottom end of the vessel, so that at least a portion of the axial portion of the third tube is configured for being submerged within the biological broth, and wherein the axial portion of the third tube radially surrounds the second tube, whereby each of the tubes in the bioreactor are concentric and disposed along the radial center of the vessel; and
the radial portion of the third tube the extends radially outward from the axial portion of the third tube, near the bottom end of the vessel, toward the radial outer surface of the vessel such that the radial portion of the third tube is configured for being submerged within the biological broth,
wherein the radial portion of the third tube defines a sparger;
the bioreactor includes a pump for pressurizing a flow of gas or fluid that is directed into the third tube, and the third tube transports the flow into the vessel for sparging the biological broth contained in the vessel;
wherein the permeable membrane separates the biological broth into the permeate and the retentate during sparging of the biological broth; and
wherein the bioreactor is without an impeller disposed in the vessel.

2. The bioreactor of claim 1, where the first tube, the second tube and the third tube all share a common longitudinal axis.

3. The bioreactor of claim 1, wherein bearings are between the second and third tubes, and the third tube is configured to spin about the second tube during sparging of the biological broth.

4. The bioreactor of claim 1, where the vessel is filled with the biological broth to a level greater than a height of the sparger.

5. The bioreactor of claim 1, where the vessel contains a vent that is in communication with a pressure regulator.

6. The bioreactor of claim 5, where the pressure regulator is operative to regulate a pressure in the vessel.

7. The bioreactor of claim 5, where the pressure regulator is operative to maintain a negative pressure or a positive pressure in the vessel.

8. The bioreactor of claim 1, further comprising a vent located on the retentate receiving tank.

9. The bioreactor of claim 3, where the permeable membrane comprises a polymer.

10. The bioreactor of claim 1, wherein the permeable membrane forms an outer circumferential boundary of the first tube and the inner circumferential boundary of the second tube.

* * * * *